(12) United States Patent
Gustafson

(10) Patent No.: US 10,266,217 B2
(45) Date of Patent: Apr. 23, 2019

(54) TRACKED VEHICLE WITH ARTICULATING FRAME

(71) Applicant: AGCO Corporation, Duluth, GA (US)

(72) Inventor: Alan D. Gustafson, Lakefield, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/772,392

(22) PCT Filed: Oct. 25, 2016

(86) PCT No.: PCT/US2016/058651
§ 371 (c)(1),
(2) Date: Apr. 30, 2018

(87) PCT Pub. No.: WO2017/078980
PCT Pub. Date: May 11, 2017

(65) Prior Publication Data
US 2018/0354568 A1  Dec. 13, 2018

Related U.S. Application Data

(60) Provisional application No. 62/251,267, filed on Nov. 5, 2015.

(51) Int. Cl.
*B62D 55/104* (2006.01)
*B62D 55/10* (2006.01)
*B62D 55/14* (2006.01)

(52) U.S. Cl.
CPC .......... *B62D 55/104* (2013.01); *B62D 55/10* (2013.01); *B62D 55/14* (2013.01)

(58) Field of Classification Search
CPC ....... B62D 55/104; B62D 55/10; B62D 55/14
See application file for complete search history.

(56) References Cited

U.S. PATENT DOCUMENTS 2,467,947 A    4/1949  Skelton
3,841,424 A  * 10/1974  Purcell ................... B62D 55/08
                                                       180/9.5
(Continued)

FOREIGN PATENT DOCUMENTS

CA    2735095        9/2012
EP    1840018 A2    10/2007
GB     611543 A     11/1948

OTHER PUBLICATIONS

UK Intellectual Property Office, International Search Report for related UK Application No. GB1520899.4, dated Apr. 29, 2016.
(Continued)

*Primary Examiner* — Joseph M Rocca
*Assistant Examiner* — Michael R Stabley

(57) ABSTRACT

An undercarriage assembly of a work machine includes a drive wheel, front and rear idler wheels and a plurality of supporting mid-rollers. A belt disposed about the drive and idler wheels. A roller frame defines a main pivot axis located between front and rear ends. The front idler wheel is connected to the front end of the track roller frame. A major bogie having a forward bogie arm and a trailing bogie arm pivotably connects to the roller frame. The rear idler wheel connects to the trailing bogie arm. The major bogie pivot is offset from the main pivot along the roller frame such that the major bogie pivot is between the main pivot and the rear end of the roller frame. A minor bogie is connected to the major bogie at a minor bogie pivot defining a minor bogie pivot axis with the mid-rollers mounted on the minor bogie.

2 Claims, 4 Drawing Sheets

(56) References Cited

U.S. PATENT DOCUMENTS

| | | | | | |
|---|---|---|---|---|---|
| 4,339,156 | A | * | 7/1982 | Livesay | B62D 55/14 305/125 |
| 4,361,363 | A | * | 11/1982 | Livesay | B62D 55/108 305/125 |
| 5,340,205 | A | | 8/1994 | Najorka | |
| 5,829,848 | A | * | 11/1998 | Kelderman | B62D 55/04 305/15 |
| 5,842,757 | A | * | 12/1998 | Kelderman | B62D 55/02 305/125 |
| 7,628,235 | B2 | * | 12/2009 | Satzler | B62D 55/30 180/9.1 |
| 2004/0099451 | A1 | | 5/2004 | Najorka et al. | |

OTHER PUBLICATIONS

European Patent Office, International Patent Application for related International Patent Application No. PCT/US2016/058651, dated Feb. 6, 2017.

* cited by examiner

TRACKED VEHICLE WITH ARTICULATING FRAME

CROSS REFERENCE TO RELATED APPLICATION

This application claims the benefit of U.S. Provisional Application No. 62/251,267 filed Nov. 5, 2015, which is hereby incorporated by reference in its entirety.

BACKGROUND OF THE INVENTION

Field of Invention

This invention relates generally to an undercarriage of an endless track work machine and more particularly to an undercarriage having a multiple degrees of motion freedom to distribute the weight of the machine and improve vehicle ride quality.

Description of Related Art

A typical tracked work machine utilizes a propulsion system in which a continuous flexible belt is frictionally driven as it is entrained about a main drive wheel and at least one idler wheel. The work machines are configured to maintain adequate tension on the endless belt around the entrained wheels, and to keep the belt in lateral alignment with the wheels when the wheels are subject to large lateral loads. Tracked work machines utilize multiple mid-rollers to distribute the vehicle's weight within the track and to help constrain the track from sliding off the wheels laterally. The main drive wheel drives the endless track belt which propels the vehicle.

Various suspension systems for tracked work vehicles have been developed. Track rollers help distribute the load of the vehicle on the track. In a rigid suspension system, the track rollers are directly mounted to the track frame and loads imparted to the track rollers are directly transferred to the track frame. In an active suspension system, the track frame is provided with a means for dampening the loads imparted to the track rollers which more evenly distributes the load as the tracks encounter obstacles.

In a typical single bogie, oscillating track suspension system used on some combine harvesters, there are two horizontal axes to permit the end idler wheels and mid-rollers to oscillate within the track system. The track roller frame is able to oscillate about a main pivot and the mid-rollers can oscillate about the bogie pivot. Hover, in such a design, as the system encounters an obstacle, the work vehicle will rise up approximately one-half the height of the obstacle and the mid-rollers will loose contact with the ground. This can lead to an uneven ride quality.

OVERVIEW OF THE INVENTION

In one aspect, the invention is directed to a tracked work machine having an undercarriage assembly configured to drive the work machine over ground. The undercarriage assembly includes a drive wheel, a front idler wheel rotatable on a front axle, the front idler wheel defining a front idler axis, and a rear idler wheel rotatable on a rear axle, the rear idler wheel defining a rear idler axis. An endless track belt is disposed about the drive and idler wheels and a plurality of supporting mid-rollers is located between the front and rear idler wheels and configured to engage the endless track belt on a lower run thereof. The undercarriage assembly includes a track roller frame pivotably mounted on the work machine with a main pivot defining a main pivot axis, the track roller frame comprising an elongate member with a front end and a rear end with the main pivot located between the front end and the rear end and the front idler wheel being connected near the front end of the track roller frame. A major bogie is connected to the track roller frame, the major bogie including a forward bogie arm and a trailing bogie arm and is pivotably connected to the track roller frame at a major bogie pivot defining a major bogie pivot axis. The rear idler wheel is connected to the trailing bogie arm. The major bogie pivot is offset from the main pivot along the track roller frame such that the major bogie pivot is at a location between the main pivot and the rear end of the track roller frame. The undercarriage assembly includes a minor bogie mounted on the forward bogie arm. The minor bogie is pivotably connected to the major bogie at a minor bogie pivot defining a minor bogie pivot axis, wherein a first of the plurality of mid-rollers is mounted on a front arm of the minor bogie and a second of the plurality of mid-rollers is mounted on a rear arm of the minor bogie. A suspension cylinder is connected between the rear end of the track roller frame and the trailing bogie arm of the major bogie.

In one aspect of the invention, the longitudinal distance between the main pivot axis and the major bogie pivot axis is between 15-25% of the distance between the front idler axis and the main pivot axis. In another aspect of the invention, the longitudinal distance between the minor bogie pivot axis and the major bogie pivot axis is between 20-30% of the distance between the minor bogie pivot axis and the rear idler axis.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
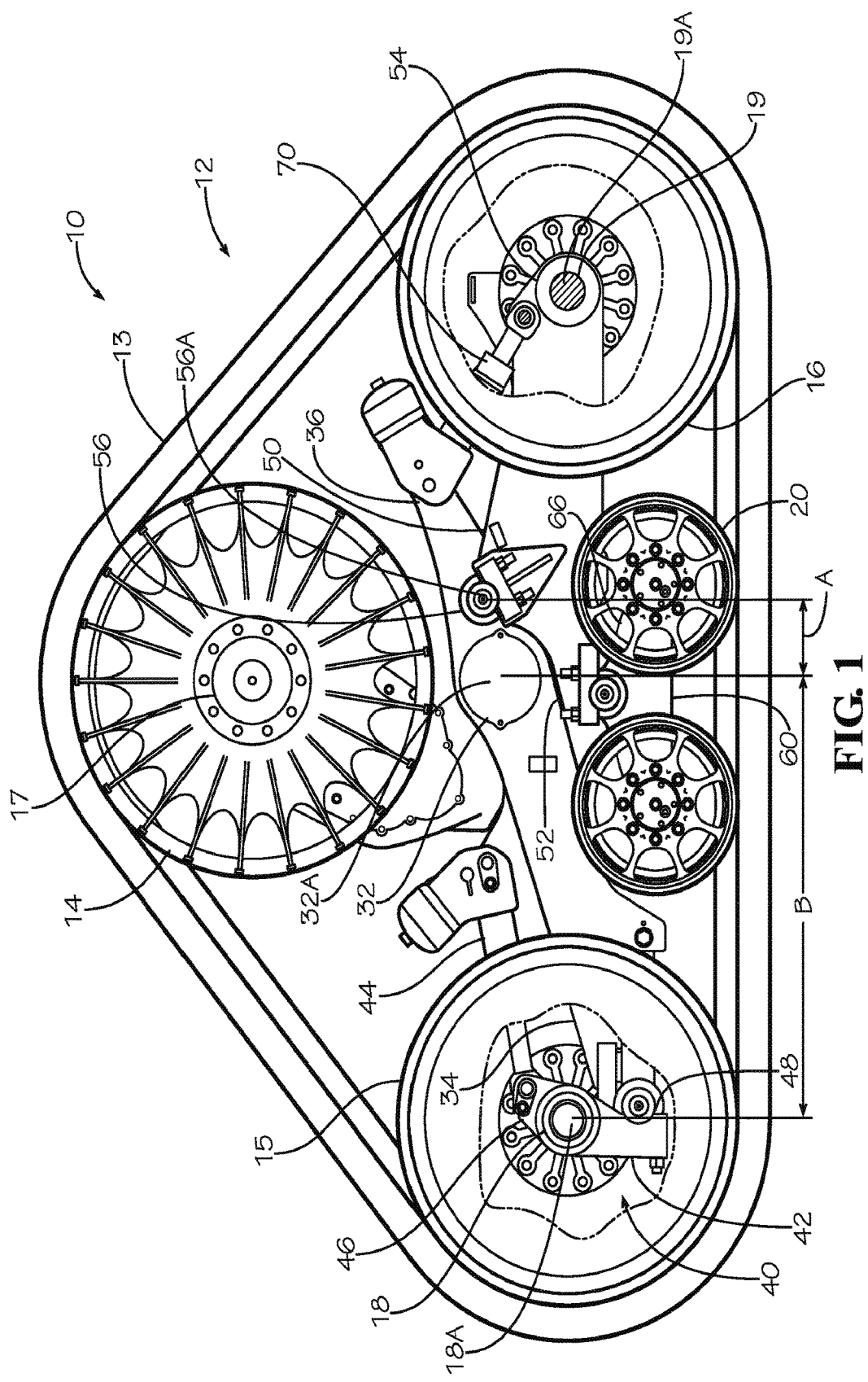
FIG. 1 is a side elevational view of an undercarriage assembly of a work machine embodying the present invention.
Figure 2:
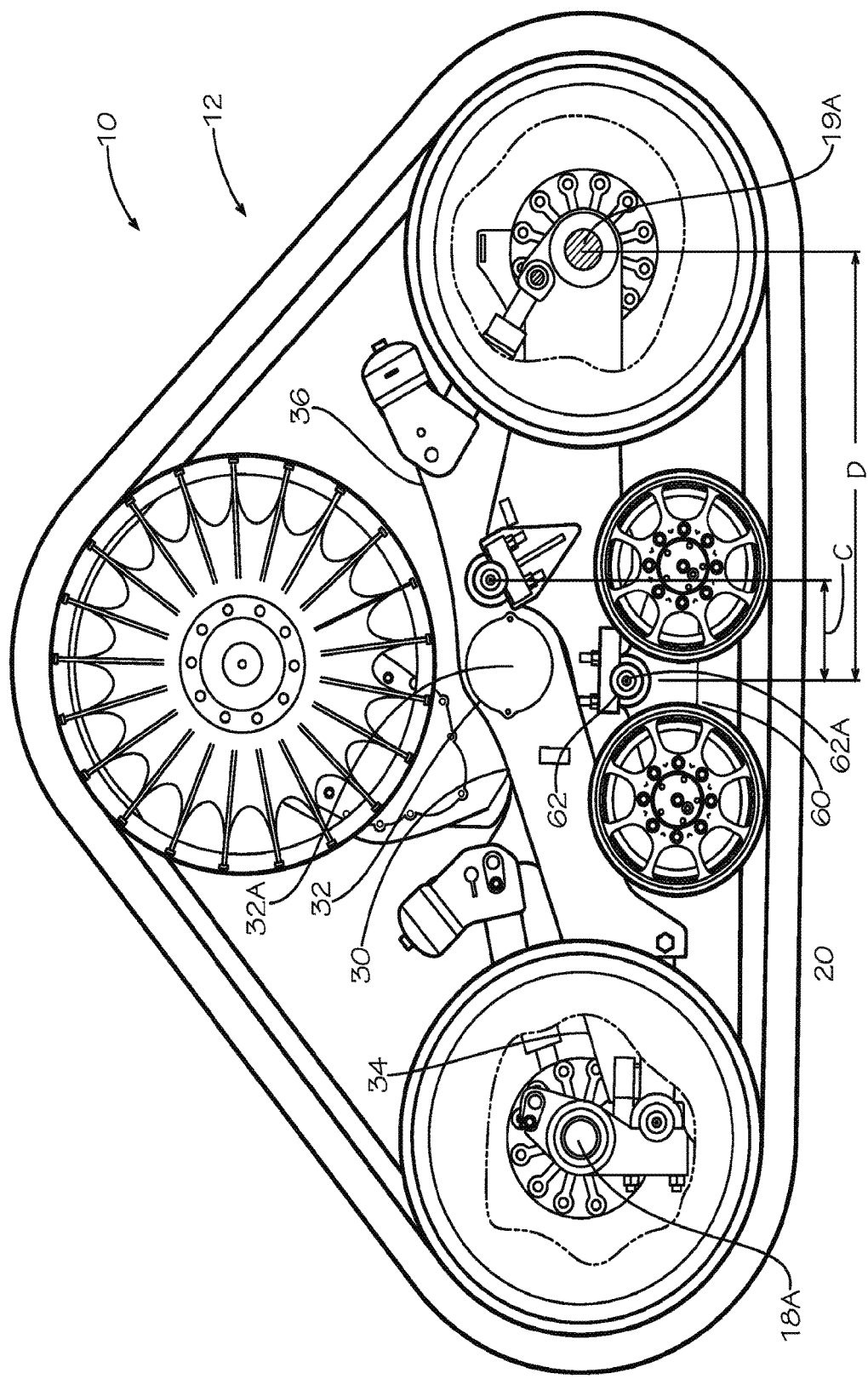
FIG. 2 is another side elevational view the undercarriage assembly of FIG. 1.

FIG. 1 illustrates a work machine 10 having an exemplary tracked undercarriage assembly 12 configured to drive the work machine over ground. In one embodiment, the work machine 10 with the tracked undercarriage assembly 12 is an agricultural combine harvester, for which it is particularly well suited, however the present invention may be used on a variety of tracked vehicles and should only be limited by the claims that follow. The tracked undercarriage assembly 12 includes an endless track belt 13, preferably made of an elastomeric material such as rubber, entrained about a drive wheel 14, a front or first idler wheel 15, and a rear or second idler wheel 16. The drive wheel is rotatable on a drive axle 17 driven by a propulsion system (not shown) of the work machine as would be understood by one skilled in the art. The front and rear idler wheels 15, 16 are rotatable on front and rear axles 18, 19, respectively, that define front and rear idler axes 18A, 19A. The drive wheel 14 and the idler wheels 15, 16 are maintained in spaced apart relation by the undercarriage assembly 12 which is connected to a chassis (not shown) of the work machine 10. In one embodiment, as is known in the art, the endless track belt 13 is provided with centering guide lugs (not shown) that engage the main drive wheel 14 to drive the track belt 13 and thereby propel the work vehicle 10.

Located between the idler wheels 15, 16 is a plurality of supporting mid-rollers 20. The endless track belt 13 is tensioned around the drive wheel 14, the idler wheels 15, 16 and is in contact with the mid-rollers 20 on a lower run thereof. The idler wheels 15, 16 and mid-rollers 20 are arranged on undercarriage assembly 12 as will be set forth herein.

The undercarriage assembly 12 includes a track roller frame 30 pivotably mounted to the chassis of the work machine 10 with a main pivot 32 defining a main pivot axis 32A. In the illustrated embodiment, the track roller frame 30 is an elongate member with a front end 34 and a rear end 36 with the main pivot 32 located between the front end 34 and the rear end 36. The front idler wheel 15 is rotatably connected near the front end 34 of the track roller frame 30 with a tensioning assembly 40 that allows controlling the tension of the belt 13, as well known in the art. In the illustrated embodiment, the tensioning assembly 40 comprises a front arm 42 mounting the front axle 18 with a hydraulic cylinder 44 attached to a first end 46 of the arm 42 and a second end 48 of the arm pivotally coupled to the front end 34 of the track roller frame 30. However, one skilled in the art will understand that other means may be used to connect the front axle 18 to the track roller frame 30 and tension the belt 13 using sound engineering judgment.

A major bogie 50 is pivotably connected to the track roller frame 30 includes a forward bogie arm 52 and a trailing bogie arm 54 and is pivotably connected to the track roller frame 30 at a major bogie pivot 56 defining a major bogie pivot axis 56A. The rear idler wheel 15 is rotatably connected to the trailing bogie arm 54 of the major bogie 50. A minor bogie 60 is pivotably mounted on the forward bogie arm 52. The minor bogie 60 is pivotably connected to the major bogie 50 at a minor bogie pivot 62 defining a minor bogie pivot axis 62A. A first of the plurality of mid-rollers 20 is mounted on a front arm 64 of the minor bogie 60 and a second of the plurality of mid-rollers 20 is mounted on a rear arm 66 of the minor bogie 60. One skilled in the art will understand that additional mid-rollers 20 may be mounted on the minor bogie 60 between the first mid-roller 20 on the front arm 64 and the last mid-roller 20 on the rear arm 66.

A suspension cylinder 70 is connected between the rear end 36 of the track roller frame 30 and the trailing bogie arm 54 of the major bogie 50. The suspension cylinder 70 provides an offsetting force that produces a similar weight distribution under all the mid-rollers 20. Varying the amount of force of the suspension cylinder 70 provides a method to adjust weight distribution. The suspension cylinder 70 is also capable of providing a dampening effect to further improve the ride of the work vehicle 10.

The pivot axes 32A, 56A and 62A are arranged to create lever ratios within the undercarriage assembly 12 that produce a slightly higher percentage of weight distribution under the mid-rollers 20 than under the front and rear idler wheels 15, 16. According to the invention, the major bogie pivot 56 is offset from the main pivot 32 along the track roller frame 30 such that the major bogie pivot 56 is at a location between the main pivot 32 and the rear end 36 of the track roller frame 30. Desirably, a longitudinal distance A between the main pivot axis 32A and the major bogie pivot axis 56A is about 15-25% of a distance B between the front idler axis 18A and the main pivot axis 32A. Desirably, a longitudinal distance C between the minor bogie pivot axis 62A and the major bogie pivot axis 56A is about 20-30% of a distance D between the minor bogie pivot axis 62A and the rear idler axis 19A.

Figure 3:
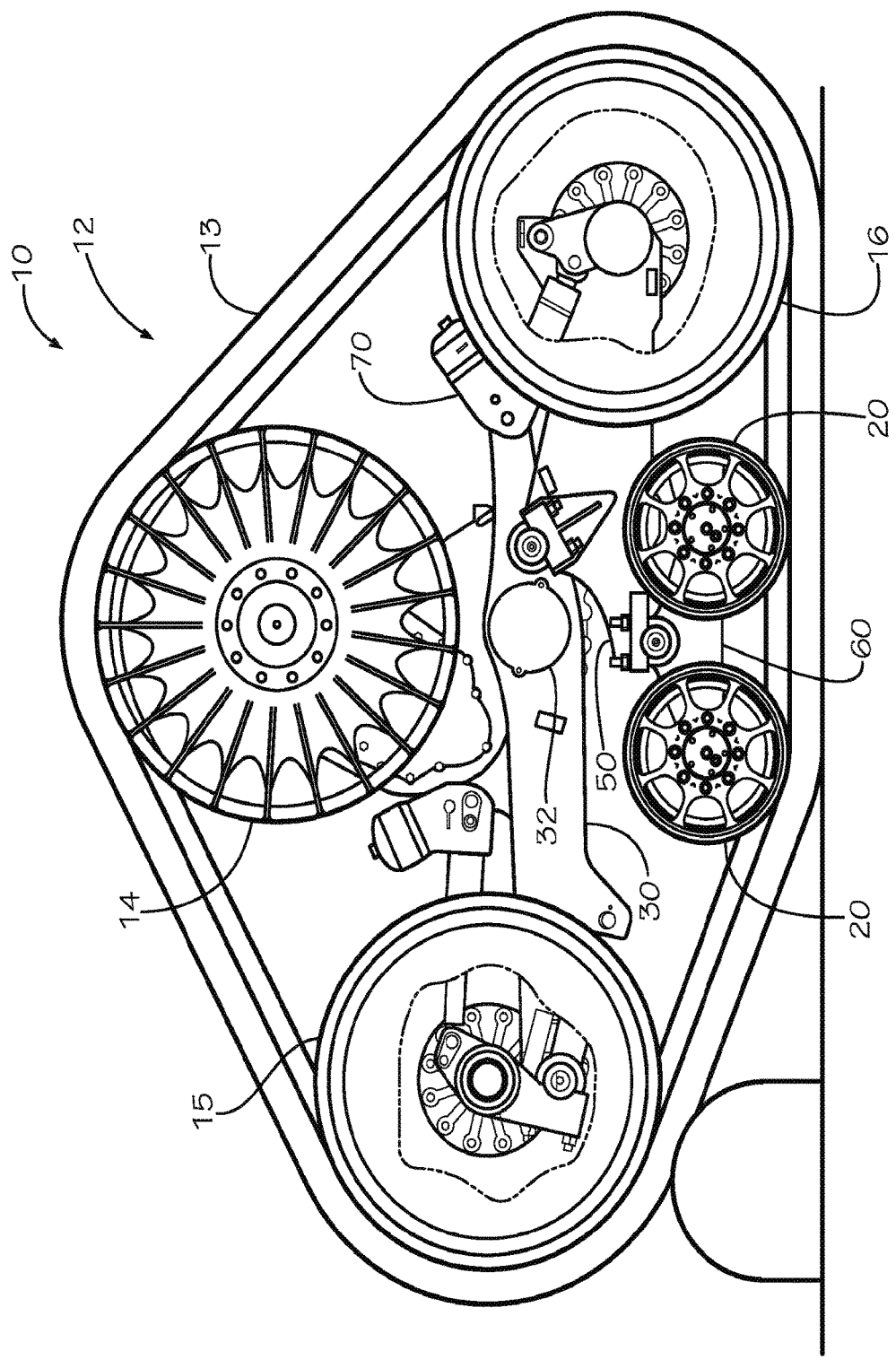
FIG. 3 is another side elevational view the undercarriage assembly of FIG. 1.
Figure 4:
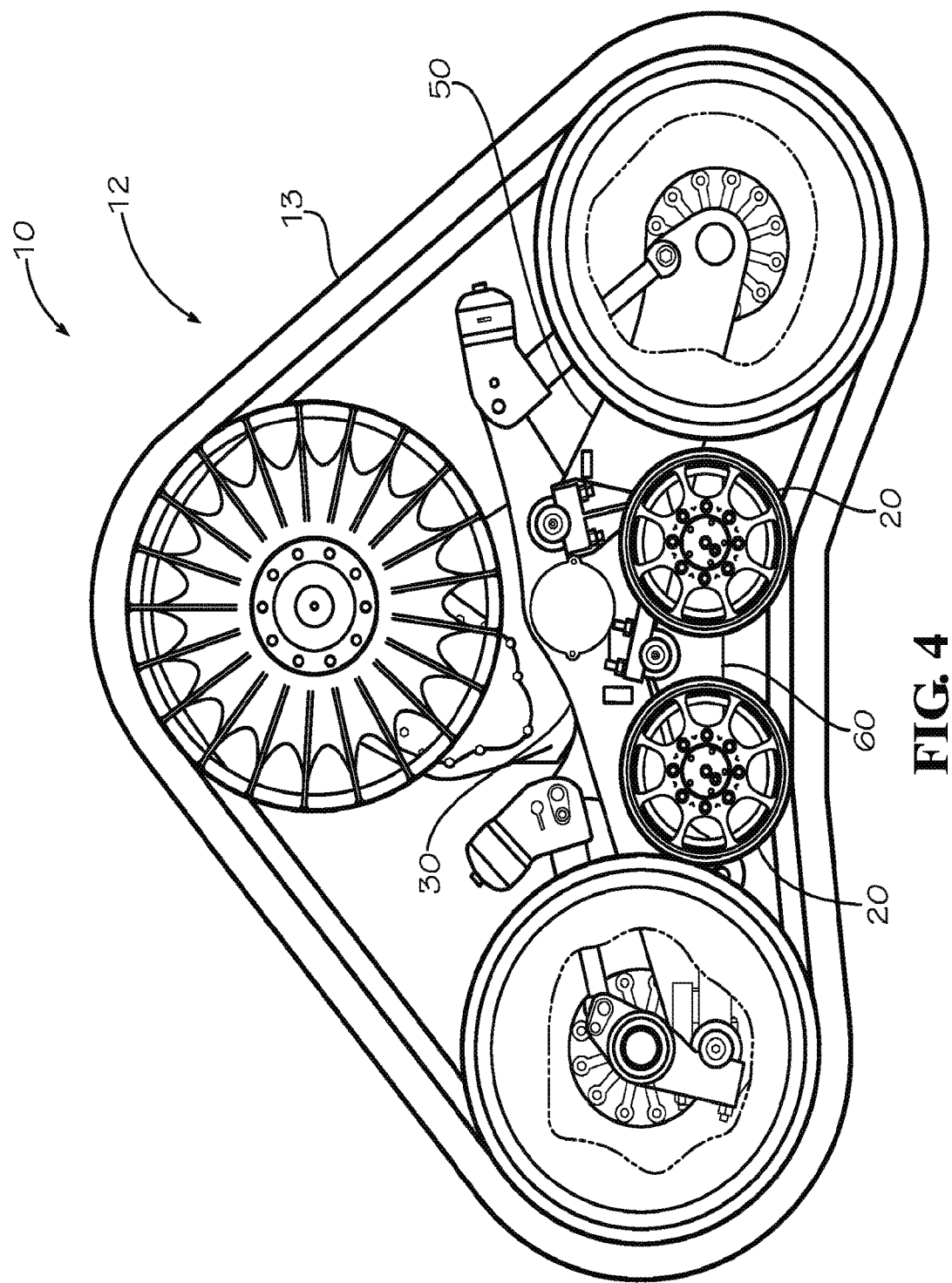
FIG. 4 is another side elevational view the undercarriage assembly of FIG. 1.

In previous designs, as the work vehicle 10 encounters an obstacle in the field, the work vehicle would raise up approximately one-half the height of the obstacle. With the additional motion provided by the addition of the major bogie 50 in the undercarriage assembly 12, the vertical motion is reduced providing a more stable ride. FIGS. 3 and 4 provide an indication of the ability of the undercarriage assembly 12 to follow uneven terrain.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A tracked work machine having an undercarriage assembly configured to drive the work machine over ground, the undercarriage assembly comprising:
   a drive wheel;
   a front idler wheel rotatable on a front axle, the front idler wheel defining a front idler axis;
   a rear idler wheel rotatable on a rear axle, the rear idler wheel defining a rear idler axis;
   an endless track belt disposed about the drive and idler wheels;
   a plurality of supporting mid-rollers located between the front and rear idler wheels and configured to engage the endless track belt on a lower run thereof;
   a track roller frame pivotably mounted on the work machine with a main pivot defining a main pivot axis, the track roller frame comprising an elongate member with a front end and a rear end with the main pivot located between the front end and the rear end and the front idler wheel being connected near the front end of the track roller frame;
   a major bogie connected to the track roller frame, the major bogie comprising a forward bogie arm and a trailing bogie arm and pivotably connected to the track roller frame at a major bogie pivot defining a major bogie pivot axis, wherein the rear idler wheel is connected to the trailing bogie arm, wherein the major bogie pivot is offset from the main pivot along the track roller frame such that the major bogie pivot is at a location between the main pivot and the rear end of the track roller frame, wherein the longitudinal distance between the main pivot axis and the major bogie pivot axis is between 15-25% of the distance between the front idler axis and the main pivot axis;

a minor bogie mounted on the forward bogie arm, the minor bogie being pivotably connected to the major bogie at a minor bogie pivot defining a minor bogie pivot axis, wherein a first of the plurality of mid-rollers is mounted on a front arm of the minor bogie and a second of the plurality of mid-rollers is mounted on a rear arm of the minor bogie; and a suspension cylinder connected between the rear end of the track roller frame and the trailing bogie arm of the major bogie.

2. The tracked work machine of claim 1 wherein the longitudinal distance between the minor bogie pivot axis and the major bogie pivot axis is between 20-30% of the distance between the minor bogie pivot axis and the rear idler axis.

\* \* \* \* \*